United States Patent [19]
Hangai et al.

[11] Patent Number: 5,142,518
[45] Date of Patent: Aug. 25, 1992

[54] GAIN CONTROL SYSTEM FOR ERROR SIGNAL AMPLIFIER IN TRACKING SERVO APPARATUS

[75] Inventors: Toshimasa Hangai; Koichi Ishitoya; Hiromi Ota, all of Saitama, Japan

[73] Assignee: Pioneer Electronic Corporation, Tokyo, Japan

[21] Appl. No.: 430,022

[22] Filed: Nov. 1, 1989

[30] Foreign Application Priority Data

Feb. 21, 1989 [JP] Japan .................................. 1-041418

[51] Int. Cl.⁵ .............................................. G11B 7/09
[52] U.S. Cl. .............................. 369/44.35; 364/44.29; 364/44.34
[58] Field of Search ............... 369/44.29, 44.32, 44.25, 369/44.35, 44.34, 44.36, 47, 32, 33, 44.11, 116, 54, 59, 44.27, 44.28; 360/77.04, 77.05, 77.06, 67, 69, 77.03; 358/342, 906

[56] References Cited

U.S. PATENT DOCUMENTS

| | | | |
|---|---|---|---|
| 4,344,165 | 8/1982 | Akiyama | 369/44.36 |
| 4,769,801 | 9/1988 | Funada et al. | 369/44.29 |

Primary Examiner—Roy N. Envall, Jr.
Assistant Examiner—Hung Dang
Attorney, Agent, or Firm—Sughrue, Mion, Zinn, Macpeak & Seas

[57] ABSTRACT

A system for controlling a gain of an error signal amplifier, the system including an error signal generation device for generating a tracking error signal corresponding to an interval between a pickup information reading point, and a recording track, on a recording disk, a position detection unit for generating a position detection signal corresponding to a position of the pickup, an error signal amplifier for amplifying the tracking error signal, and a control device for controlling a tracking state of the pickup information reading point in accordance with an output of the error signal amplifier. The control device is operable for stopping a tracking state, moving the pickup information reading point in the radial direction of said disk, measuring a level of the tracking error signal at a plurality of different positions of the disk, calculating a plurality of gain data corresponding to the respective values of the levels of the tracking error signal measured at the plurality of positions, and writing the calculated gain data into a memory. The control device is further operable for re-starting the tracking state, detecting the position of the pickup information reading point, reading out, from the memory, the gain data corresponding to the detected position, and controlling the gain of the error signal amplifier according to the read-out gain data.

6 Claims, 5 Drawing Sheets

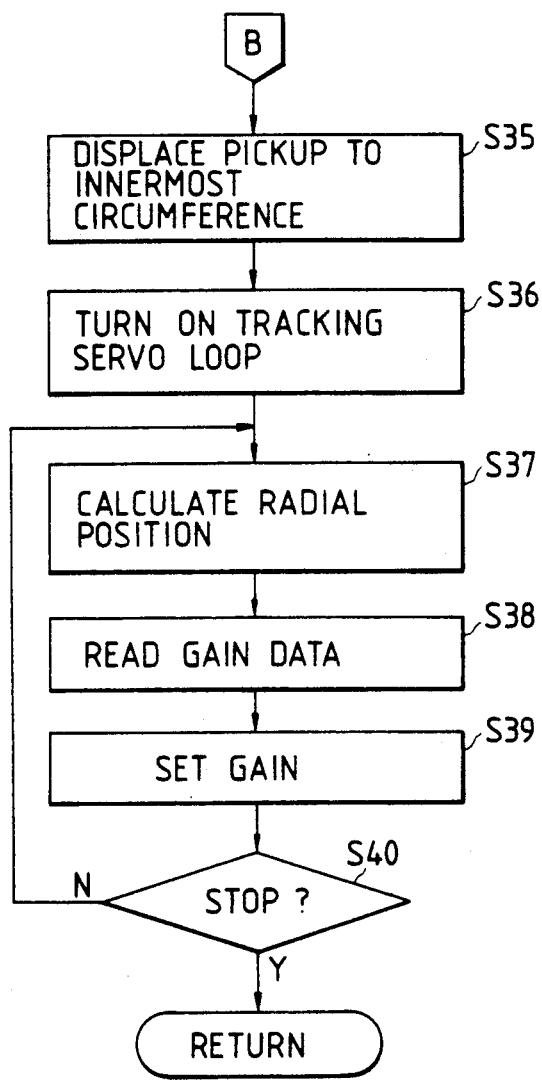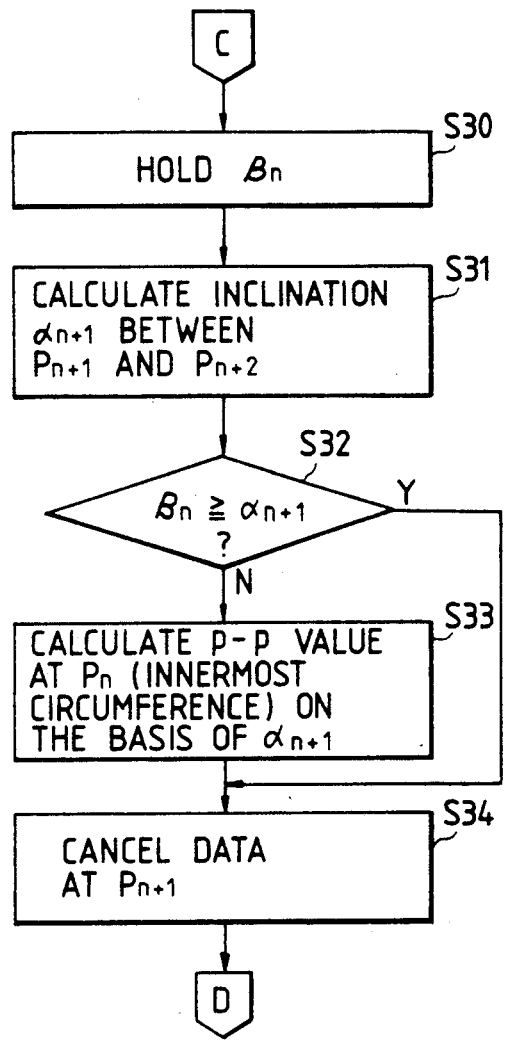

GAIN CONTROL SYSTEM FOR ERROR SIGNAL AMPLIFIER IN TRACKING SERVO APPARATUS

FIELD OF THE INVENTION

The present invention relates to a system for controlling the gain of an error signal amplifier in a tracking servo apparatus.

BACKGROUND OF THE INVENTION

For example, an optical video disk has recess portions called pits arranged in one main surface of the disk so as to form concentric or spiral tracks or an eddy track so that signals can be recorded on the tracks by changing the length and intervals of the pits.

A signal recorded on such a disk is read in a manner so that the disk is irradiated with laser light and the light reflected from the disk or transmitted through the disk is made incident on a photoelectric conversion means for generating a signal corresponding to the quantity of the incident light. In a disk player for reading a signal recorded on such a disk, it is necessary to provide a tracking servo apparatus for causing a laser light spot acting as an information reading point of a pickup to follow correctly a recording track.

As the tracking servo apparatus, for example, it is known to use an apparatus of a so-called three-beam system in which three beams, one being an information reading main beam, and two being tracking-error detecting subsidiary beams disposed on the opposite sides of the main beam, are prepared and arranged so that a line passing through the centers of the respective beams forms a predetermined offset angle with respective to the tracking direction so as to generate an error signal on the basis of a difference in quantity of light between the two subsidiary beams passed through a recording surface of the disk.

It is empirically known that the level of a tracking error signal generated in such a tracking servo apparatus varies in accordance with the relative positional relation between an information reading point and the radial direction of a disk. It is considered that this is because the curvature of a track varies depending on the position on the disk, that is, the curvature of a track is different between the inner and outer circumferential positions on the disk. Thus, the level of a tracking error signal varies substantially linearly corresponding to the relative position of an information reading point of a pickup in the radial direction of a disk so that the level is small at the outer circumference of the disk while large at the inner circumference of the disk. If this tracking error signal is used to perform tracking control, it is difficult to perform the control correctly depending on the relative position of the information reading point of the pickup in the radial direction of the disk.

To eliminate the above difficulty, there has been proposed an apparatus in which the relative position of a pickup in the radial direction of a disk is detected so that control is made to make the gain of an error signal amplifier larger when the detected information reading point is located at the innermost circumference of the disk than that of the error signal amplifier when the detected information reading point is located at the outermost circumference of the disk, as disclosed, for example, in Published Examined Japanese Utility Model Application No. 62-6580.

Such a conventional apparatus has, however, a disadvantage in that it has sometimes been difficult to perform control correctly depending on the disk because of scattering in characteristics of disks, since the gain of an error signal amplifier is controlled only on the basis of the relative position of a pickup.

SUMMARY OF THE INVENTION

It is therefore an object of the present invention to eliminate the foregoing disadvantage.

It is another object of the present invention to provide a gain control system for an error signal amplifier in a tracking servo apparatus, in which it is possible to perform preferable tracking control independent of the scattering in characteristics of disks as well as the relative position of an information reading point of a pickup in the radial direction of a disk.

The gain control system for an error signal amplifier in a tracking servo apparatus according to the present invention is configured as follows. The control of the tracking state of the information reading point of a pickup is stopped in accordance with a command, and the information reading point of the pickup is compulsively displaced in the radial direction of a disk so that the level of a tracking error signal is measured at a plurality of positions in the radial direction of the disk and a plurality of gain data corresponding to the values of the level of the tracking error signal measured at the plurality of positions are generated and written into a memory. Then the control of the tracking state is restarted so that the position of the information reading point of the pickup is detected and the gain data corresponding to the detected position is read out from the memory so as to control the gain of the error signal amplifier on the basis of the read-out gain data.

BRIEF DESCRIPTION OF THE DRAWINGS

Other features and advantages of the present invention will be apparent from the following description taken in conjunction with the accompanying drawings, wherein:

FIGS. 2(a) to 2(d) show flowcharts for explaining the operation of the processor in the apparatus of FIG. 1;

DETAILED DESCRIPTION OF THE PREFERRED EMBODIMENT

An embodiment of the present invention will be described in detail hereunder with reference to the drawings.

Figure 1:
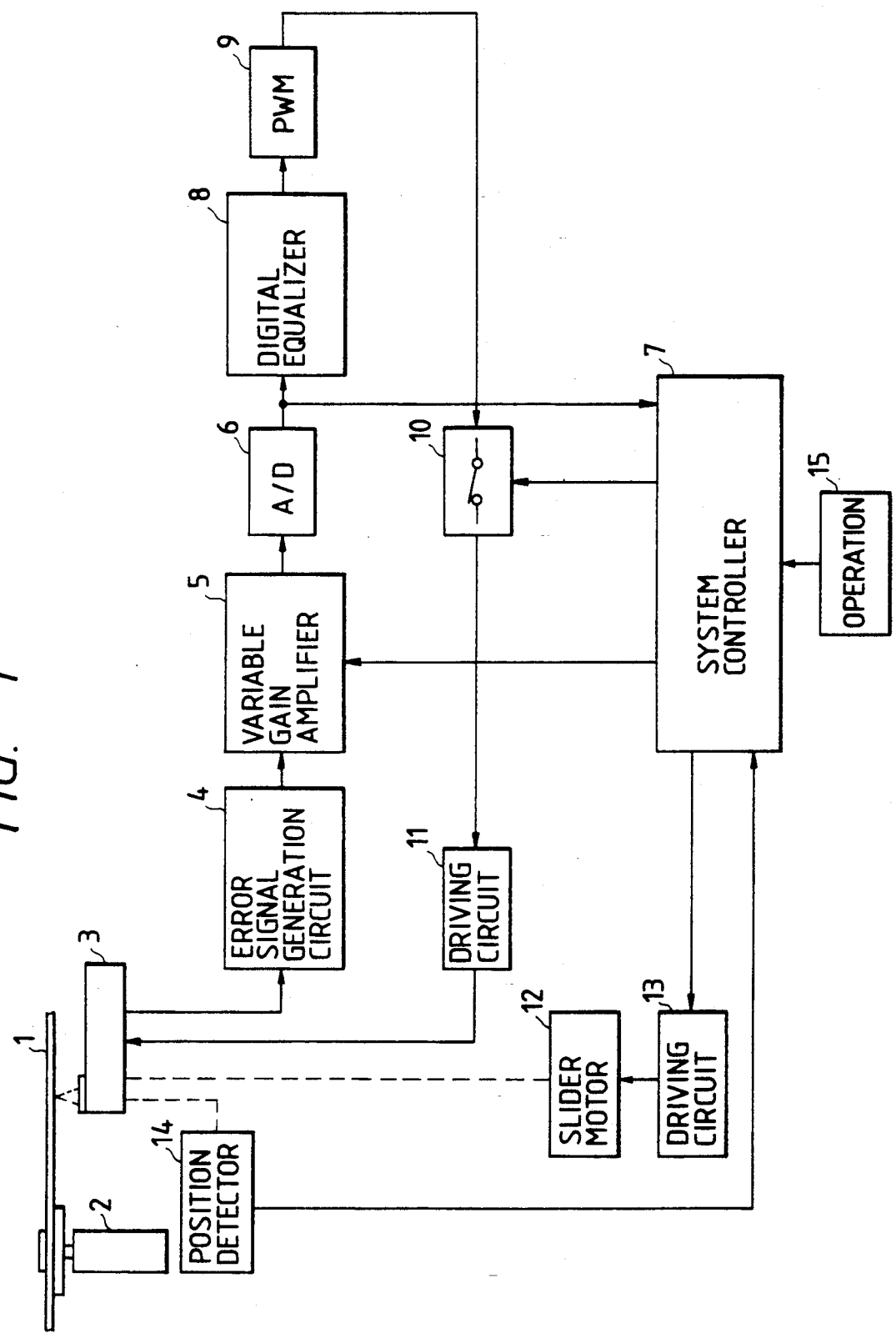
FIG. 1 is a block diagram showing an embodiment of the present invention.
Figure 2A:
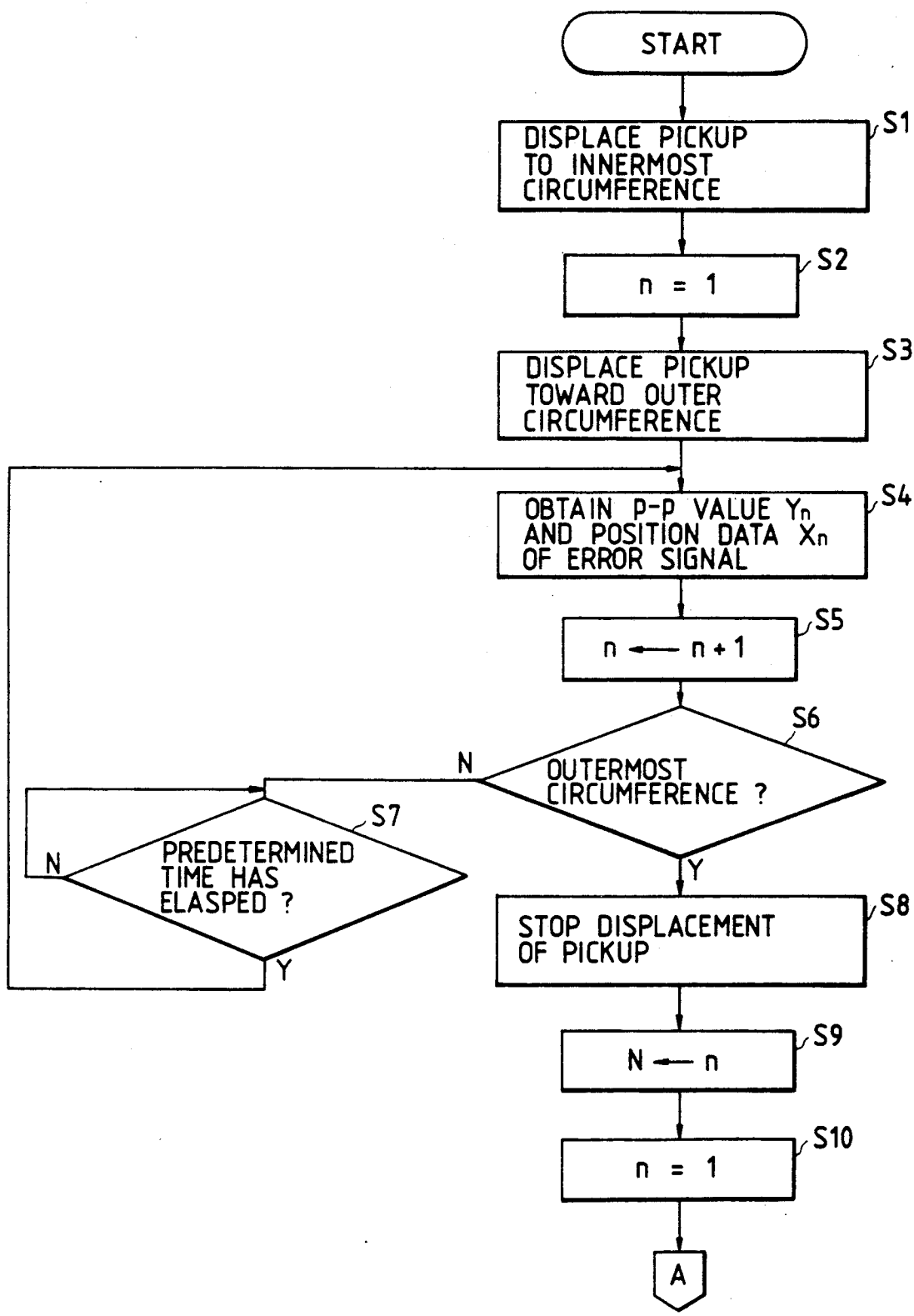
Figure 2B:
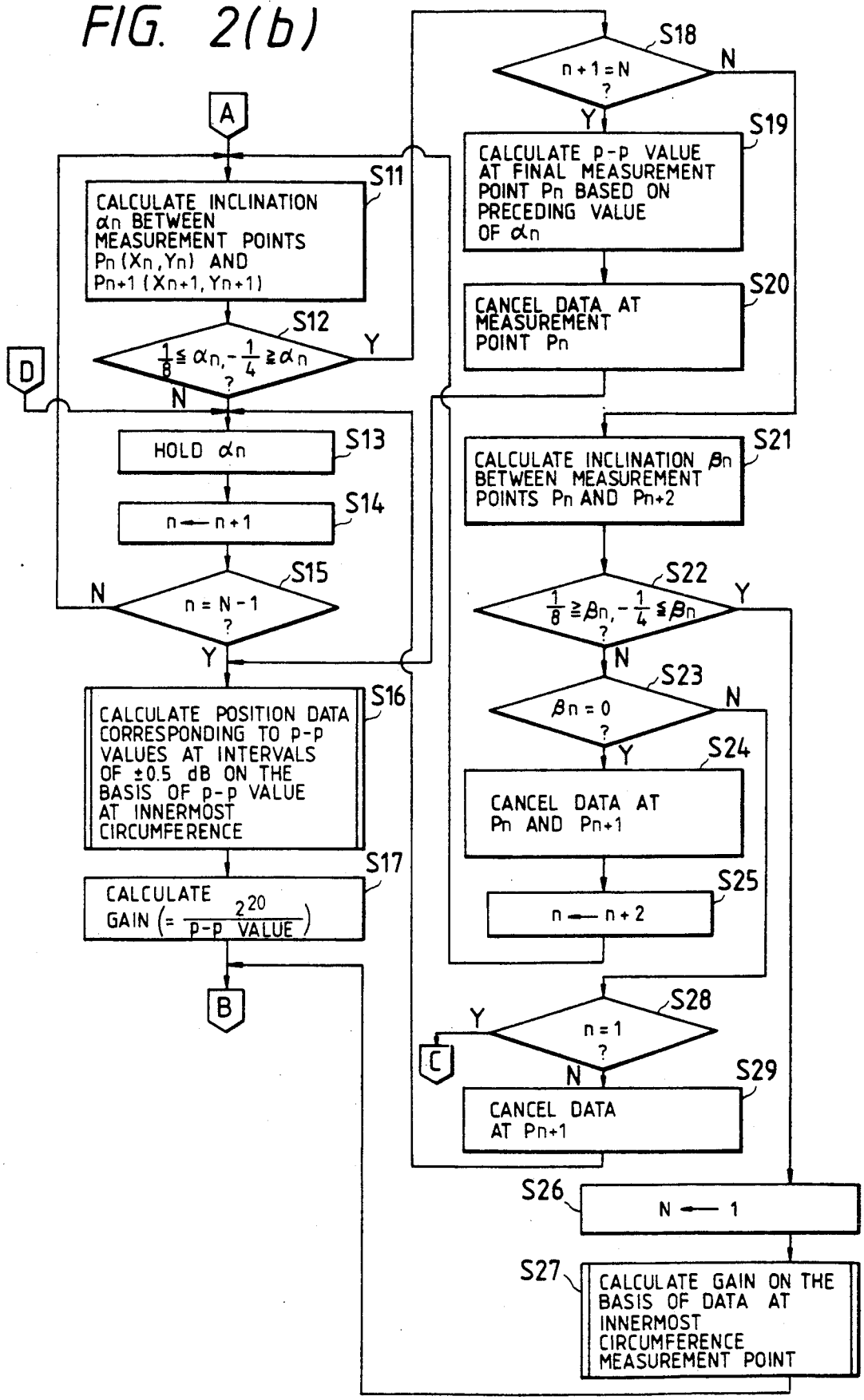

In FIG. 1, a disk 1 is driven to rotate by a spindle motor 2. A signal recorded on the disk 1 is read by a pickup 3 with rotation of the disk 1. The pickup 3 is provided with a laser diode, an objective lens, a focus actuator, a tracking actuator, a photodetector, etc. The output of the photodetector (which is built in the pickup 3) is supplied to an error signal generation circuit 4 which generates a tracking error signal, for example, by using a three-beam system. The method of generating an error signal by using the three-beam system is well known, and therefore, explanation about the specific configuration and operation of the method is omitted.

The tracking error signal produced from the error signal generation circuit 4 is supplied to an A/D (analog-to-digital) conversion circuit 6 through a variable gain amplifier 5. A sampling pulse a having a predetermined frequency is supplied from a timing signal generation circuit (not shown) to the A/D conversion circuit 6. In the A/D conversion circuit 6, the tracking error signal is sampled on the basis of the sampling pulse a and digital data corresponding to the obtained sampled value is generated. The output data of the A/D conversion circuit 6 is supplied to a system controller 7 as well as a digital equalizer 8 constituted by a digital filter, etc. The digital tracking error signal from the A/D conversion circuit 6 is subjected to phase compensation in the digital equalizer 8.

The output of the digital equalizer 8 is supplied to a PWM (pulse width modulation) circuit 9 which is configured in a manner so that a pulse having a time width corresponding to the level of the tracking error signal is generated on the basis of a timing pulse b which is supplied from the timing signal generation circuit (not shown) in synchronism with the sampling pulse a. The output pulse of the PWM circuit 9 is used to drive the tracking actuator in the pickup 3 through an analog switch 10 and a driving circuit 11. The pickup 3 is carried on a slider (not shown) which is supported so as to be movable in the radial direction of the disk 1 and which is arranged to be driven by a slider motor 12. A driving signal is supplied from the system controller 7 to the slider motor 12 through a driving circuit 13.

The system controller 7 is supplied with the output of a position detector 14 for detecting the position of the pickup 3 relative to the radial direction of the disk 1 (hereinafter, referred to as "radial position"), as well as various commands from an operation circuit 15. The position detector 14 is constituted, for example, by a potentiometer connected so as to generate a voltage corresponding to the radial position of the slider (not shown) and an A/D converter for A/D conversion of the output voltage of the potentiometer.

The system controller 7 is provided with a microcomputer constituted, for example, by a processor, an ROM, an RAM, a timer, etc., so that the processor operates in accordance with a program stored in advance in the ROM to supply control data or the like to the variable gain amplifier 5, the analog switch 10, and the driving circuit 13 on the basis of the output data of the A/D conversion circuit 6 and the position detector 14.

Referring to the flowcharts of FIGS. 2(a) to 2(d), description will be made as to the operation of the processor in the system controller 7 configured as described above.

Upon generation of a start command from the operation part 15 in the execution of a main routine or the like, the processor shifts its operation to the step S1 so as to supply a driving signal to the driving circuit 13 to displace the pickup 3 to the innermost circumference of the disk 1. At this time, it is assumed that the gain of the variable gain amplifier 5 is set to a predetermined value and the analog switch 10 is in its opened state.

Thereafter, the processor initializes a count value n to be "1" (step S2), and supplies a driving signal to the driving circuit 13 to cause the driving circuit 13 to start displacement of the pickup 3 toward the outer circumference of the disk 1 (step S3). During the displacement of the pickup 3, the processor measures a value $Y_n$ corresponding to a difference between positive and negative peak levels (hereinafter, referred to as "p—p value") of a tracking error signal on the basis of the output data of the A/D conversion circuit 6 on one hand and fetches the output data of the position detector 14 so as to write the output data into a predetermined area of the RAM as a position data $X_n$ representing the position of the measurement point $P_n$ upon measurement of the p—p value (step S4). After execution of the step S4, the processor adds "1" to the count value n, and makes the timer start to count (step S5). On the basis of the output of the position detector 14, judgment is made as to whether or not the pickup 3 has reached the outermost circumference (step S6). If the judgment proves that the pickup 3 has not yet reached the outermost circumference in the step S6, further judgment is made as to whether the predetermined time started by the timer in the step S5 has elapsed or not (step S7). Only when the judgment proves that the predetermined time has elapsed, the operation is shifted to the step S4. If the judgment proves that the pickup 3 has reached the outermost circumference in the step S6, on the contrary, the processor stops supplying of the driving signal to the driving circuit 13, thereby stopping the displacement of the pickup 3 (step S8). The processor stores the current value N of the count value n in the RAM (step S9) and then sets the count value n to "1" (step S10).

After execution of the step S10, the processor calculates the inclination $\alpha_n$ of the line between measurement points $P_n(X_n, Y_n)$ and $P_{n+1}(X_{n+1}, Y_{n+1})$ on a plane of coordinates on which the radial position is represented by the X-axis and the p—p value is represented by the Y-axis (step S11). Then, judgment is made as to whether or not the thus obtained inclination $\alpha_n$ is not smaller than $\frac{1}{8}$, or not larger than $-\frac{1}{4}$ (step S12).

If the judgment proves that the inclination $\alpha_n$ is smaller than $\frac{1}{8}$ or larger than $-\frac{1}{4}$ in the step S12, the processor temporarily holds the inclination $\alpha_n$ in a register or the like (step S13), and adds "1" to the count value n (step S14). Then, judgment is made as to whether or not the count value n is equal to the number of measurement points N to judge whether or not the measurement point $P_n$ is the final one (step S15).

If the judgment proves that the measurement point $P_n$ is not the final one in the step S15, then the processor shifts the operation to the step S11 again. If the judgment proves that the measurement point $P_n$ is the final one in the step S15, then the processor calculates the p—p values each of which is different from the p—p value at the innermost circumference by a value which is integer times as large as ±0.5 dB, and calculates respective position data corresponding to the thus calculated p—p values (step S16). Then, the processor calculates gains $G_i$ ($=2^{20}$/p—p value) at various measurement points represented by the respective calculated position data, and writes the gains $G_i$ into the predetermined area of the RAM (step S17). Thereafter, the processor supplies a driving signal to the driving circuit 13 to cause the driving circuit 13 to displace the pickup 3 to the innermost circumference (step S35; FIG. 2(c)).

If the judgment proves that the inclination $\alpha_n$ is not smaller than $\frac{1}{8}$ or not larger than $-\frac{1}{4}$ in the step S12, then the processor judges whether or not the count value (n+1) is equal to the number of measurement points N to thereby judge whether or not the measurement point $P_{n+1}$ is a final one (step S18). If the judgment proves that the measurement point $P_{n+1}$ is a final one in the step S18, the processor calculates the p—p value at the final measurement point on the basis of the preceding value of the inclination $\alpha_n$ (step S19), and cancels the position data and the p—p value at the measurement point $P_{n+1}$ (step S20). Then, the operation is shifted to the step S16.

If the judgment proves that the measurement point $P_{n+1}$ is not a final one in the step S18, on the contrary, the processor obtains an inclination $\beta_n$ of the line between the measurement points $P_n$ and $P_{n+2}$ (step S21), and judges whether or not the inclination $\beta_n$ is not smaller than $\frac{1}{8}$ or larger than $-\frac{1}{8}$ in the step S22, and then the processor judges whether or not the inclination $\beta_n$ is equal to "0" (step S23). If the judgment proves that the inclination $\beta_n$ is equal to "0" in the step S23, then the processor cancels the position data and the p—p values at the measurement points $P_n$ and $P_{n+1}$ (step S24), and adds "2" to the count value n (step S25). The operation is then shifted to the step S11 again.

If the judgment proves that the inclination $\beta_n$ is not smaller than $\frac{1}{8}$ or not larger than $-\frac{1}{8}$ in the step S22, on the contrary, the processor sets the number of data N to "1" (step S26), and calculates the p—p values at various measurement points before the outermost circumference on the basis of data at the innermost circumference measurement point to thereby obtain gains (step S27). The operation is then shifted to the step S35.

If the judgment proves that the inclination $\beta_n$ is not equal to "0" in the step S23, then the processor judges whether or not the count value n is "1" to judge whether or not the measurement point $P_n$ is the innermost circumference measurement point (step S28). If the judgment proves that the measurement point $P_n$ is not the innermost circumference measurement point in the step S28, then the processor cancels the position data $X_{n+1}$ and the p—p value $Y_{n+1}$ at the measurement point $P_{n+1}$ (step S29). The operation is then shifted to the step S13.

If the judgment proves that the measurement point $P_n$ is the innermost circumference measurement point in the step S28, then the processor temporarily holds the inclination $\beta_n$ (step S30), and obtains an inclination $\alpha_{n+1}$ of the line between the measurement points $P_{n+1}$ and $P_{n+2}$ (step S31). Then, judgment is made as to whether or not the inclination $\beta_n$ is not smaller than $\alpha_{n+1}$ (step S32). If the judgment proves that the inclination $\beta_n$ is smaller than $\alpha_{n+1}$ in the step S32, the processor obtains the p—p value at the innermost circumference measurement point $P_n$ on the basis of the inclination $\alpha_{n+1}$ (step S33), and cancels the position data $X_{n+1}$ and the p—p value $Y_{n+1}$ at the measurement point $P_{n+1}$ (step S34). Then, the operation is shifted to the step S13. If the judgment proves that the inclination $\beta_n$ is not smaller than $\alpha_{n+1}$ in the step 32, on the contrary, the processor immediately shifts the operation to the step S34.

After execution of the step S35, the processor turns the analog switch 10 on (step 36), and detects the relative position of the pickup 3 on the basis of the output of the position detector 14 (step S37) to obtain a gain corresponding to the detected relative position (step S38). After execution of the step S38, the processor sets the gain of the variable gain amplifier 5 (step S39), and judges whether or not a stop command has been issued (step S40). If the judgment proves that a stop command has not been issued in the step S40, the processor shifts the operation to the step S37. If the judgment proves that a stop command has been issued, then the processor restarts the execution of the routine which was being executed immediately before the operation has been shifted to the step S1.

Figure 3:
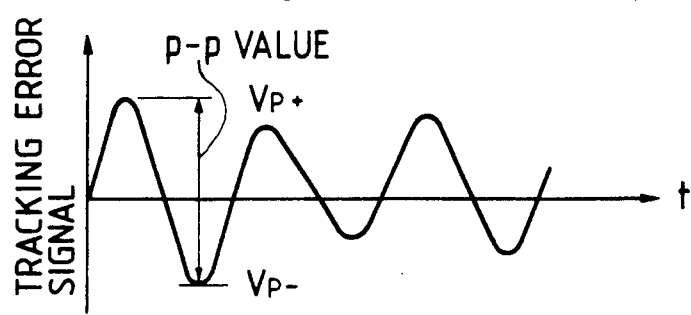
FIG. 3 is a waveform diagram of a tracking error signal.

Each of the tracking error signals obtained at various positions in the radial direction of the disk by the foregoing operation in the steps S1 to S8 varies in such a manner as shown in FIG. 3. The value corresponding to a difference between the positive peak level $V_{p+}$ and the negative peak level $V_{p-}$ of the tracking error signal is measured $Y_n$ and stored as the p—p value in the RAM together with the position data $X_n$ representing the radial position where the measurement has been performed.

Thereafter, data at the measurement points where measurement errors have been generated are canceled from the RAM in the steps S11 to S34, and the p—p values each of which is different from the p—p value of the innermost circumference by a value integer times as large as ±0.5 dB are calculated only on the basis of correct data. Then, position data corresponding to the calculated p—p values are calculated, and gains $G_i$ ($=2^{20}$/p—p value) at various points represented by the calculated position data are calculated and written into a predetermined area of the RAM.

Figure 4:
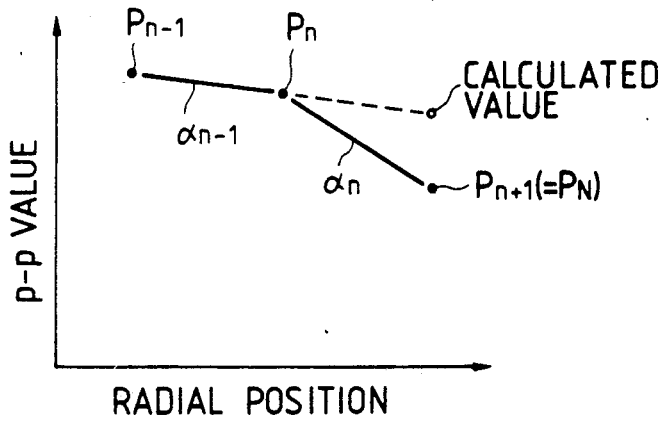
FIGS. 4 and 5 are diagrams for explaining the actions by the operation of the processor in the apparatus of FIG. 1.

Cancellation of data at a measurement point where a measurement error has been generated is performed as follows. In the case where the inclination $\alpha_n$ of the line between the measurement points $P_n(X_n, Y_n)$ and $P_{n+1}(X_{n+1}, Y_{n+1})$ adjacent to each other in the plane of coordinates on which the radial position is represented by the X-axis and the p—p value is represented by the Y-axis is not smaller than $\frac{1}{8}$ or not larger than $-\frac{1}{8}$ and the measurement point $P_{n+1}$ is the final measurement point $P_n$ as shown in FIG. 4, it is judged, by the operation in the steps S18 to S20, that the measurement point $P_n$ where a measurement error has occurred. Then, the measurement value at the final measurement point $P_n$ is calculated on the basis of the inclination $\alpha_{n+1}$, that is the preceding value of the inclination $\alpha_n$, and the data at the measurement point $P_n$ is canceled from the predetermined area of the RAM.

Figure 5:
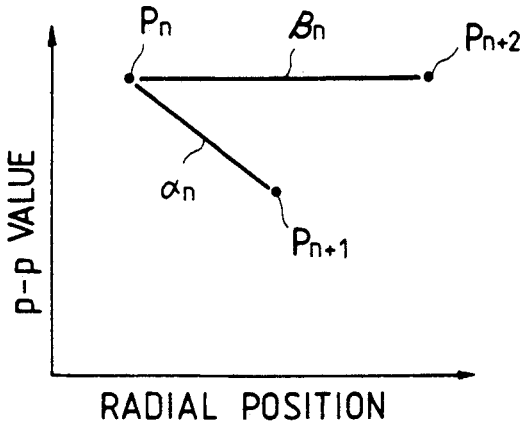

In the case where the inclination $\alpha_n$ is not smaller than $\frac{1}{8}$ or not larger than $-\frac{1}{8}$ and the measurement point $P_{n+1}$ is not the final measurement point $P_n$, the inclination $\beta_n$ of the line between the measurement points $P_n$ and $P_{n+2}$ is calculated in the step S21. In the case where the inclination $\beta_n$ is equal to "0" as shown in FIG. 5, it is judged, by the operation in the steps S22 to S24, that each of the measurement points $P_n$ and $P_{n+1}$ has a measurement error, and the data at the measurement points $P_n$ and $P_{n+1}$ are canceled from the predetermined area of the RAM.

In the case where the inclination $\beta_n$ is not equal to "0" and when the measure point $P_n$ is not the innermost circumference measurement point $P_1$, it is judged, by the operation in the steps S28 and S29, that the measurement point $P_{n+1}$ has a measurement error, and data at the measurement point $P_{n+1}$ is canceled from the predetermined area of the RAM. When the measurement point $P_n$ is the innermost circumference measurement point $P_1$, the inclination $\alpha_{n+1}$ of the line between the measurement points $P_n$ and $P_{n+2}$ is calculated by the operation in the steps S30 to S34, and judgment is made on the basis of the result of comparison between $\beta_n$ and $\alpha_{n+1}$. That is, if $\beta_n < \alpha_{n+1}$, then it is judged that the innermost circumference measurement point has a measurement error, and data of the innermost circumference measurement point is calculated on the basis of $\alpha_{n+1}$. If $\beta_n \geq \alpha_{n+1}$, then it is judged that the measurement point $P_{n+1}$ has a measurement error, and data of the measurement point $P_{n+1}$ is canceled from the predetermined area of the RAM.

Thereafter, the tracking servo loop is turned on in the steps S35 to S40, so that the gain of the variable gain amplifier 5 is controlled on the basis of the gain data $G_i$ calculated on the basis of the p—p value of the error signal which is measured for every radial position of the disk 1 and stored in a predetermined area of the RAM. Therefore, the level of the tracking error signal used as a driving signal to be applied to the tracking actuator is substantially fixed independently of the radial position to thereby perform optimum tracking control. Further, since the gain data $G_i$ is calculated on the basis of the p—p value of the error signal measured every time a start command is issued, the tracking control is not affected by the scattering in characteristics of disks.

As described above, the gain control system for an error signal amplifier in a tracking servo apparatus according to the present invention is configured as follows. The control of the tracking state of the information reading point of a pickup is stopped in accordance with a command, and the information reading point of the pickup is compulsively displaced in the radial direction of a disk so that the level of a tracking error signal is measured at a plurality of positions in the radial direction of the disk and a plurality of gain data corresponding to the values of the level of the tracking error signal measured at the plurality of positions are generated and written into a memory. Then the control of the tracking state is re-started so that the position of the information reading point of the pickup is detected and the gain data corresponding to the detected position is read out from the memory so as to control the gain of the error signal amplifier on the basis of the read-out gain data. As described above, in the gain control system for an error signal amplifier in a tracking servo apparatus according to the present invention, the gain of the error signal amplifier is controlled by gain data calculated on the basis of the level of the error signal measured at every radial position of the disk, so that the level of the tracking error signal to be supplied to the means for controlling the tracking state in response to the tracking error signal is substantially fixed independently of the radial position, thereby performing proper tracking control. Further, since the gain data is calculated on the basis of the level of the tracking error signal measured every time a start commend is issued, the tracking control is not affected by the scattering in characteristics of disks so that excellent tracking control can be performed.

It should be understood that although the present invention has been described in connection with a specific embodiment, further modifications to the invention may be made. The present invention is only limited to the subject matter defined in the claims.

What is claimed is:

1. A system for controlling a gain of an error signal amplifier in a tracking servo apparatus, said system comprising:

an error signal generation means for generating a tracking error signal corresponding to an interval between a pickup information reading point, and a recording track, on a recording disk;

a position detection means for generating a position detection signal corresponding to a position of said pickup relative to the recording disk in the radial direction thereof;

an error signal amplifier for amplifying said tracking error signal; and a control means for controlling a tracking state of the pickup information reading point in accordance with an output of said error signal amplifier, said control means for stopping a tracking state, moving the pickup information reading point in the radial direction of said disk, measuring a level of said tracking error signal at a plurality of different positions in the radial direction of said disk, calculating a plurality of gain data corresponding to the respective values of the levels of said tracking error signal measured at said plurality of positions, and writing the calculated gain data into a memory, said control means further for re-starting said tracking state, detecting the position of said pickup information reading point, reading out, from the memory, the gain data corresponding to the detected position, and controlling the gain of said error signal amplifier according to the read-out gain data.

2. The system defined in claim 1, wherein said control means is further for determining if each of the measured levels of the tracking error signal is correct according to a first predetermined standard, and for replacing the level of each of the measured tracking error signals determined to be incorrect with a different tracking error signal level according to a second predetermined standard.

3. The system defined in claim 1, wherein said control means determines that a measured level of the tracking error signal at a position n of the disk is incorrect if the measured level satisfies at least one of the following equations: $\alpha_n \leq \frac{1}{8}$ and $\alpha_n \geq -\frac{1}{8}$, wherein $\alpha_n$ represents an inclination between levels of tracking error signals $P_n$ and $P_{n+1}$.

4. The system defined in claim 1, further comprising a driving circuit for moving said pickup in accordance with an output of said control means, said driving circuit for moving said pickup, after the tracking state is stopped by said control means, from an inner circumference position of the disk to an outer circumference position of the disk.

5. The system defined in claim 4, wherein said control means re-starts the tracking state after said pickup is moved to the outer circumference of the disk by said driving circuit.

6. The system defined in claim 1, further comprising a driving circuit for moving said pickup, during the tracking state, in accordance with an output of said error signal amplifier.

* * * * *